US012592083B2

(12) United States Patent
Lee et al.

(10) Patent No.: US 12,592,083 B2
(45) Date of Patent: Mar. 31, 2026

(54) SYSTEMS AND METHODS FOR CONTROLLING A VEHICLE BY DETECTING AND TRACKING OBJECTS THROUGH ASSOCIATED DETECTIONS

(71) Applicant: Kodiak Robotics, Inc., Mountain View, CA (US)

(72) Inventors: Ryan T. Lee, Mountain View, CA (US); Derek J. Phillips, Mountain View, CA (US); Collin C. Otis, Driggs, ID (US)

(73) Assignee: Kodiak Robotics, Inc., Mountain View, CA (US)

( * ) Notice: Subject to any disclaimer, the term of this patent is extended or adjusted under 35 U.S.C. 154(b) by 457 days.

(21) Appl. No.: 18/062,228

(22) Filed: Dec. 6, 2022

(65) Prior Publication Data

US 2024/0185612 A1 Jun. 6, 2024

(51) Int. Cl.
*G06V 10/82* (2022.01)
*G06V 10/762* (2022.01)
*G06V 20/58* (2022.01)

(52) U.S. Cl.
CPC ............ *G06V 20/58* (2022.01); *G06V 10/762* (2022.01); *G06V 10/82* (2022.01)

(58) Field of Classification Search
None
See application file for complete search history.

(56) References Cited

U.S. PATENT DOCUMENTS

| | | | |
|---|---|---|---|
| 2014/0063232 A1 | 3/2014 | Fairfield et al. | |
| 2020/0004256 A1 | 1/2020 | Russell et al. | |
| 2020/0365016 A1 | 11/2020 | Silver et al. | |
| 2023/0024101 A1* | 1/2023 | de Haan | G06N 3/047 |
| 2023/0237378 A1* | 7/2023 | Kranski | G06N 7/01 |
| | | | 706/12 |
| 2023/0419678 A1* | 12/2023 | Kabkab | G06V 20/58 |
| 2024/0127579 A1* | 4/2024 | Capellier | G05D 1/0274 |

* cited by examiner

*Primary Examiner* — Idowu O Osifade
(74) *Attorney, Agent, or Firm* — Fox Rothschild LLP

(57) ABSTRACT

This disclosure provides methods and systems for dynamically detecting and tracking objects in an environment of an autonomous vehicle. In some embodiments, the method comprises: receiving image data from sensors of the autonomous vehicle, the image data comprising a plurality of images representative of objects in a field of view of the autonomous vehicle; detecting the objects in the plurality of images through an object detector; generating image embeddings for the objects detected in the plurality of images; determining similarity scores of the image embeddings of the objects that are detected in images received from two or more different sensors; identifying the objects that are detected in the images received from the two or more different sensors as a candidate object for tracking, if the objects have a similarity score of the image embeddings equal to or greater than a threshold value; and initializing a track for the candidate object.

20 Claims, 7 Drawing Sheets

400

Receive sensor data from a plurality of sensors of the autonomous vehicle, image data comprising a plurality of images representative of objects in a field of view of the autonomous vehicle
401

Detect the objects in the plurality of images through an object detector
402

Generate image embeddings for the objects detected in the plurality of images
403

Determine similarity scores of the image embeddings of the objects that are detected in images received from two or more different sensors
404

Identify the objects that are detected in the images received from the two or more different sensors as a candidate object for tracking, if the objects have a similarity score of the image embeddings greater than a threshold value
405

Initialize a track for the candidate object
406

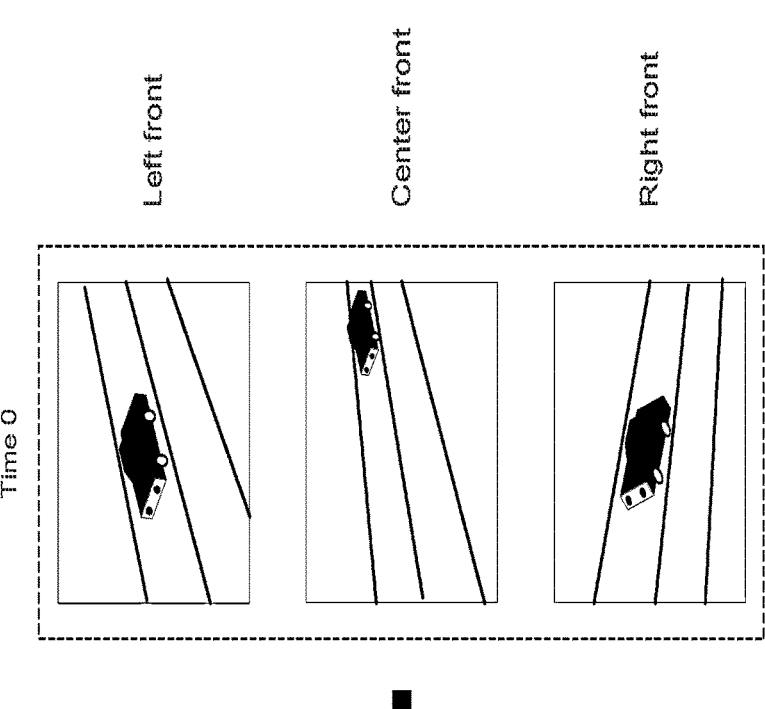
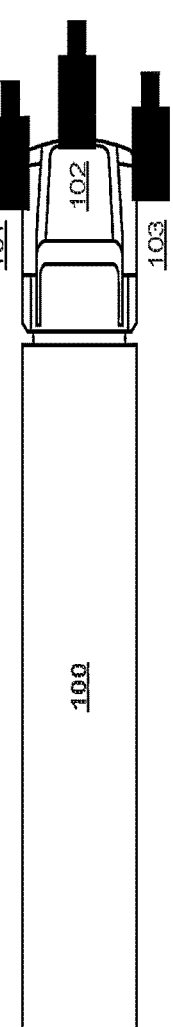
FIG. 1a

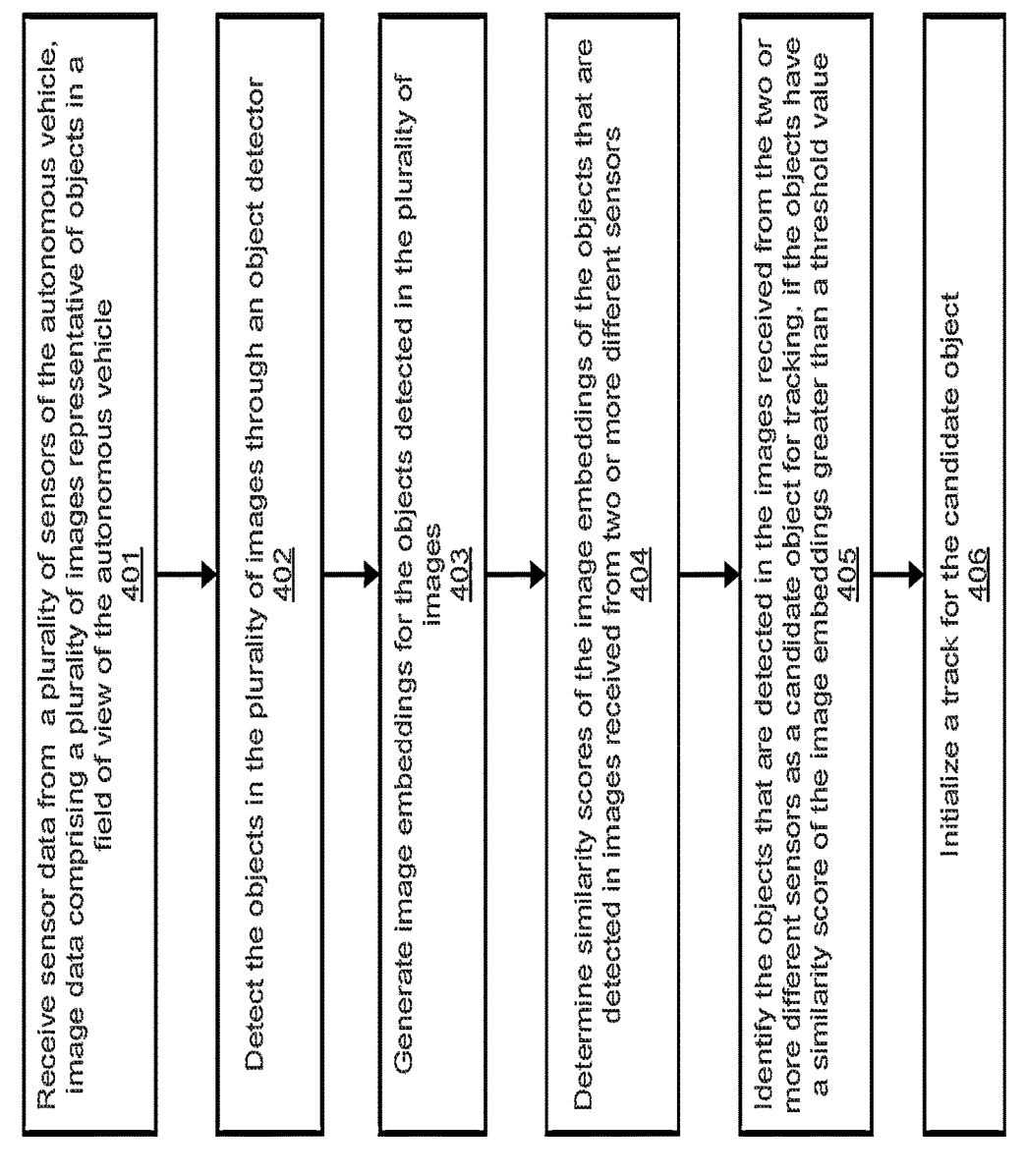

400

Receive sensor data from a plurality of sensors of the autonomous vehicle, image data comprising a plurality of images representative of objects in a field of view of the autonomous vehicle
401

Detect the objects in the plurality of images through an object detector
402

Generate image embeddings for the objects detected in the plurality of images
403

Determine similarity scores of the image embeddings of the objects that are detected in images received from two or more different sensors
404

Identify the objects that are detected in the images received from the two or more different sensors as a candidate object for tracking, if the objects have a similarity score of the image embeddings greater than a threshold value
405

Initialize a track for the candidate object
406

FIG. 4

SYSTEMS AND METHODS FOR CONTROLLING A VEHICLE BY DETECTING AND TRACKING OBJECTS THROUGH ASSOCIATED DETECTIONS

FIELD

This disclosure relates generally to systems and methods for controlling a vehicle by detecting and tracking objects through associated detections.

BACKGROUND

Autonomous vehicles refer to vehicles that replace human drivers with sensors, computer-implemented intelligence, and other automation technology. Autonomous vehicles can be used to aid in the transport of passengers or items from one location to another. Such vehicles may operate in a fully autonomous mode where passengers may provide some initial input, such as a pickup or destination location, and the vehicle maneuvers itself to that location. While doing so, the safety of the passengers and the vehicle is an important consideration. Thus, there should be a high degree of confidence that automated vehicles will not collide with objects or obstacles within the environment of autonomous vehicles.

Therefore, there is a need for effective systems and methods for controlling a vehicle by dynamically detecting and tracking objects or obstacles in its environment.

SUMMARY

This disclosure addresses the above need in a number of aspects. In one aspect, this disclosure provides a method of dynamically detecting and tracking objects in an environment of an autonomous vehicle. In some embodiments, the method comprises: receiving image data from sensors of the autonomous vehicle, the image data comprising a plurality of images representative of objects in a field of view of the autonomous vehicle; and using a processor: (a) detecting the objects in the plurality of images through an object detector; (b) generating image embeddings for the objects detected in the plurality of images; (c) determining similarity scores of the image embeddings of the objects that are detected in images received from two or more different sensors; (d) identifying the objects that are detected in the images received from the two or more different sensors as a candidate object for tracking, if the objects have a similarity score of the image embeddings equal to or greater than a threshold value; and (e) initializing a track for the candidate object.

In some embodiments, the step of generating the image embeddings comprises generating the image embeddings by an embedding encoder trained using contrastive representation learning.

In some embodiments, the sensors comprise two or more cameras. In some embodiments, the method comprises preprocessing the images prior to detecting the objects.

In some embodiments, the image embeddings are represented by feature vectors.

In some embodiments, the method further comprises: generating additional image embeddings for objects detected in a second set of images received at a different time; and determining similarity scores between the image embeddings and the additional image embeddings.

In some embodiments, the method comprises performing incremental clustering to determine the similarity scores between existing image embeddings and new embeddings.

In some embodiments, the method comprises: determining a second similarity score between an image embedding of the candidate object and the additional image embeddings; and updating the image embedding of the candidate object if the second similarity score is equal to or greater than the threshold value.

In some embodiments, the object detector comprises a neural network object detector.

In some embodiments, the step of determining the similarity scores of image the embeddings of the objects comprises determining the similarity scores of image the embeddings of the objects by clustering using the DBSCAN algorithm.

In another aspect, this disclosure further provides a system for dynamically detecting and tracking objects in an environment of an autonomous vehicle. In some embodiments, the system comprises: a plurality of sensors, configured to receive image data comprising a plurality of images representative of objects in a field of view of the autonomous vehicle; and a processor, configured to: (i) detect the objects in the plurality of images through an object detector; (ii) generate image embeddings for the objects detected in the plurality of images; (iii) determine similarity scores of the image embeddings of the objects that are detected in images received from two or more different sensors; (iv) identify the objects that are detected in the images received from the two or more different sensors as a candidate object for tracking, if the objects have a similarity score of the image embeddings equal to or greater than a threshold value; and (v) initialize a track for the candidate object.

In some embodiments, the processor is configured to generate the image embeddings by an embedding encoder trained using contrastive representation learning.

In some embodiments, the sensors comprise two or more cameras. In some embodiments, the processor is configured to preprocess the images prior to detecting the objects.

In some embodiments, the image embeddings are represented by feature vectors.

In some embodiments, the processor is further configured to generate additional image embeddings for objects detected in a second set of images received at a different time, and determine similarity scores between the image embeddings and the additional image embeddings.

In some embodiments, the processor is configured to perform incremental clustering to determine the similarity scores between existing image embeddings and new embeddings.

In some embodiments, the processor is configured to determine a second similarity score between an image embedding of the candidate object and the additional image embeddings, and update the image embedding of the candidate object if the second similarity score is equal to or greater than the threshold value.

In some embodiments, the object detector comprises a neural network object detector.

In some embodiments, the processor is configured to determine the similarity scores of image the embeddings of the objects by clustering using the DBSCAN algorithm.

The foregoing summary is not intended to define every aspect of the disclosure, and additional aspects are described in other sections, such as the following detailed description. The entire document is intended to be related as a unified disclosure, and it should be understood that all combinations of features described herein are contemplated, even if the combinations of features are not found together in the same sentence, or paragraph, or section of this document. Other features and advantages of the invention will become apparent from the following detailed description. It should be understood, however, that the detailed description and the specific examples, while indicating specific embodiments of the disclosure, are given by way of illustration only, because various changes and modifications within the spirit and scope of the disclosure will become apparent to those skilled in the art from this detailed description.

BRIEF DESCRIPTION OF THE DRAWINGS

FIGS. 1a and 1b show an example method for controlling an autonomous vehicle by dynamically detecting and tracking objects through associating detections from different cameras (FIG. 1a) and across time (FIG. 1b), according to various embodiments of the present disclosure.

FIG. 4 shows an example method for controlling an autonomous vehicle through dynamically detecting and tracking objects based on associated detections, according to various embodiments of the present disclosure.

DETAILED DESCRIPTION

Figure 1B:
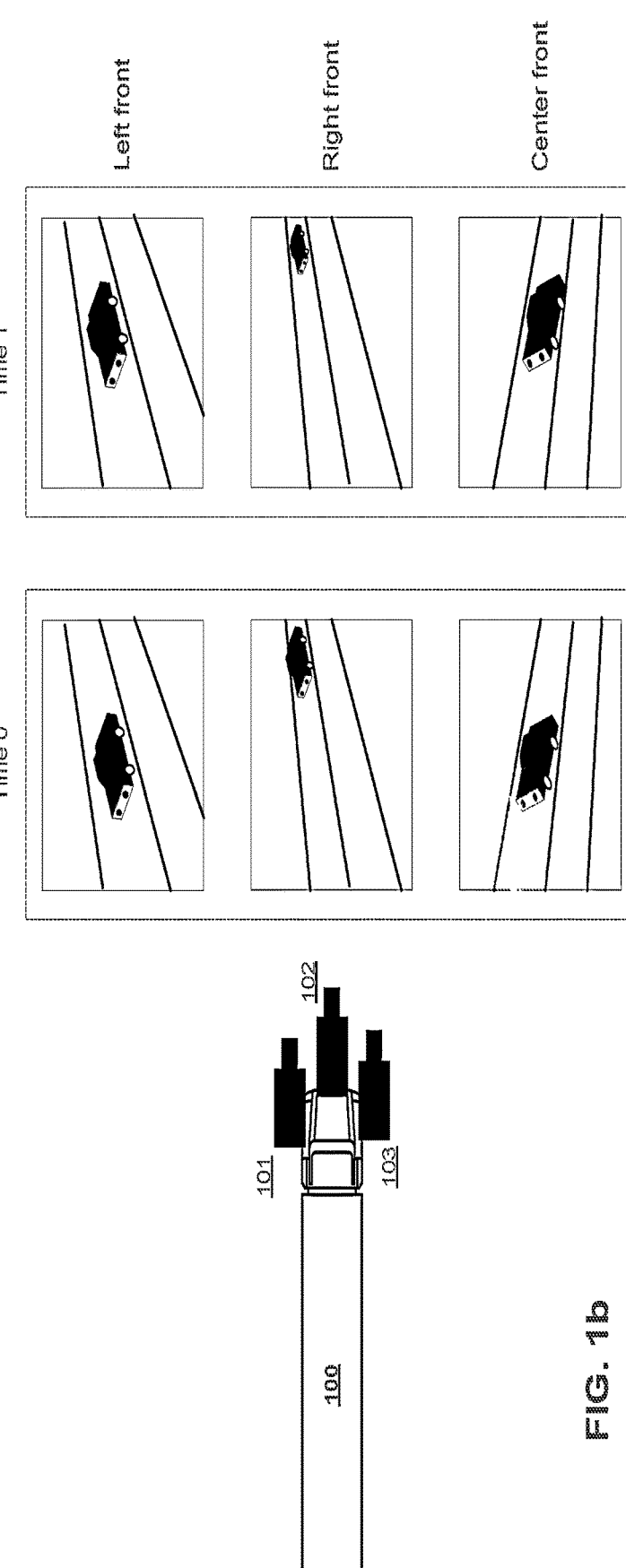

The terminology used herein is for the purpose of describing particular embodiments only and is not intended to be limiting of the disclosure. As used herein, the singular forms "a," "an," and "the," are intended to include the plural forms as well, unless the context clearly indicates otherwise. These terms are merely intended to distinguish one component from another component, and the terms do not limit the nature, sequence or order of the constituent components.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements.

In addition, the terms "unit," "-er," "-or," and "module" described in the specification mean units for processing at least one function and operation, and can be implemented by hardware components or software components and combinations thereof.

In this document, when terms such as "first" and "second" are used to modify a noun, such use is simply intended to distinguish one item from another, and is not intended to require a sequential order unless specifically stated.

In addition, terms of relative position such as "vertical" and "horizontal," or "front" and "rear," when used, are intended to be relative to each other and need not be absolute, and only refer to one possible position of the device associated with those terms depending on the device's orientation.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "computer-readable storage medium," "data store," "data storage facility," and the like each refer to a non-transitory device on which computer-readable data, programming instructions or both are stored. Except where specifically stated otherwise, the terms "memory," "memory device," "computer-readable storage medium," "data store," "data storage facility," and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The terms "instructions" and "programs" may be used interchangeably herein. The instructions may be stored in object code format for direct processing by the processor, or in any other computing device language, including scripts or collections of independent source code modules that are interpreted on demand or compiled in advance. Functions, methods, and routines of the instructions are explained in more detail below. The instructions may be any set of instructions to be executed directly (such as machine code) or indirectly (such as scripts) by the processor. For example, the instructions may be stored as computing device code on the computing device-readable medium.

The term "data" may be retrieved, stored or modified by processors in accordance with a set of instructions. For instance, although the claimed subject matter is not limited by any particular data structure, the data may be stored in computing device registers, in a relational database as a table having a plurality of different fields and records, XML documents or flat files. The data may also be formatted in any computing device-readable format.

The term "module" or "unit" refers to a set of computer-readable programming instructions, as executed by a processor, that cause the processor to perform a specified function.

The term "vehicle," or other similar terms, refers to any motor vehicles, powered by any suitable power source, capable of transporting one or more passengers and/or cargo. The term "vehicle" includes, but is not limited to, autonomous vehicles (i.e., vehicles not requiring a human operator and/or requiring limited operation by a human operator), automobiles (e.g., cars, trucks, sports utility vehicles, vans, buses, commercial vehicles, etc.), boats, drones, trains, and the like.

The term "autonomous vehicle," "automated vehicle," "AV," or "driverless vehicle," as used herein, refers to a vehicle capable of implementing at least one navigational change without driver input. A "navigational change" refers to a change in one or more of steering, braking, or acceleration of the vehicle. To be autonomous, a vehicle need not be fully automatic (e.g., fully operation without a driver or without driver input). Rather, an autonomous vehicle includes those that can operate under driver control during certain time periods and without driver control during other time periods. Autonomous vehicles may also include vehicles that control only some aspects of vehicle navigation, such as steering (e.g., to maintain a vehicle course between vehicle lane constraints), but may leave other aspects to the driver (e.g., braking). In some cases, autonomous vehicles may handle some or all aspects of braking, speed control, and/or steering of the vehicle. Autonomous vehicles may be any type of vehicle including, but not limited to, cars, trucks, motorcycles, busses, recreational vehicles, agricultural vehicles, construction vehicles etc. According to various embodiments, autonomous vehicles may include a throttle control system and a braking system. Autonomous vehicles may include one or more engines and/or one or more computing devices. The one or more computing devices may be separate from the automated speed control system or the braking system. Additionally, the computing device may include a processor and/or a memory. The memory may be configured to store programming instructions that, when executed by the processor, are configured to cause the processor to perform one or more tasks. In certain embodiments, autonomous vehicles may include a receiver configured to process the communication between autonomous vehicles and a teleoperation system.

The term "trajectory" or "map" is used broadly to include, for example, a motion plan or any path or route from one place to another; for instance, a path from a pickup location to a drop-off location.

Although certain embodiments are described as using a plurality of units to perform disclosed processes, it is understood that the disclosed processes may also be performed by one or plurality of modules. Additionally, it is understood that the term controller/control unit refers to a hardware device that includes a memory and a processor and is specifically programmed to execute the processes described herein. The memory is configured to store the modules, and the processor is specifically configured to execute said modules to perform one or more processes which are described further below.

Further, the control logic of the present disclosure may be embodied as non-transitory computer-readable media on a computer-readable medium containing executable programming instructions executed by a processor, controller, or the like. Examples of computer-readable media include, but are not limited to, ROM, RAM, compact disc (CD)-ROMs, magnetic tapes, floppy disks, flash drives, smart cards, and optical data storage devices. The computer-readable medium can also be distributed in network-coupled computer systems so that the computer-readable media may be stored and executed in a distributed fashion, such as, e.g., by a telematics server or a Controller Area Network (CAN).

Unless specifically stated or obvious from context, as used herein, the term "about" is understood as within a range of normal tolerance in the art, for example, within two standard deviations of the mean. About can be understood as within 10%, 9%, 8%, 7%, 6%, 5%, 4%, 3%, 2%, 1%, 0.5%, 0.1%, 0.05%, or 0.01% of the stated value.

Hereinafter, systems and methods for controlling a vehicle in response to an abnormal condition, according to embodiments of the present disclosure, will be described with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

With reference to FIGS. 1a and 1b, autonomous vehicles, e.g., an autonomous vehicle 100, may be used to bring goods or passengers to desired locations safely. There should be a high degree of confidence that autonomous vehicles will not collide with objects or obstacles in an environment of the autonomous vehicle. The existing tracking and association pipeline has many inefficiencies. For example, the object track initialization process requires three consecutive detections from the same camera. This can be problematic as any false detections will reset the count for initialization and the use of other cameras are underutilized when there is shared information between them. Additionally, when tracks are not consistently associated with the most recent detections, ID switches and fragmentation occurs, which can create challenges for planning and other parts of the self-driving system downstream.

Unlike the existing methods that rely on consecutive images from a single camera, the methods and systems as disclosed herein are capable of dynamically detecting and tracking objects by associating the same object between cameras (FIG. 1a, e.g., left front camera 101, center front camera 102, and right front camera 103) and across time (FIG. 1b; Time 0, Time 1, etc.). The disclosed methods and systems may be used to more efficiently detect and track objects in the environment of the autonomous vehicle than the existing methods.

Figure 2:
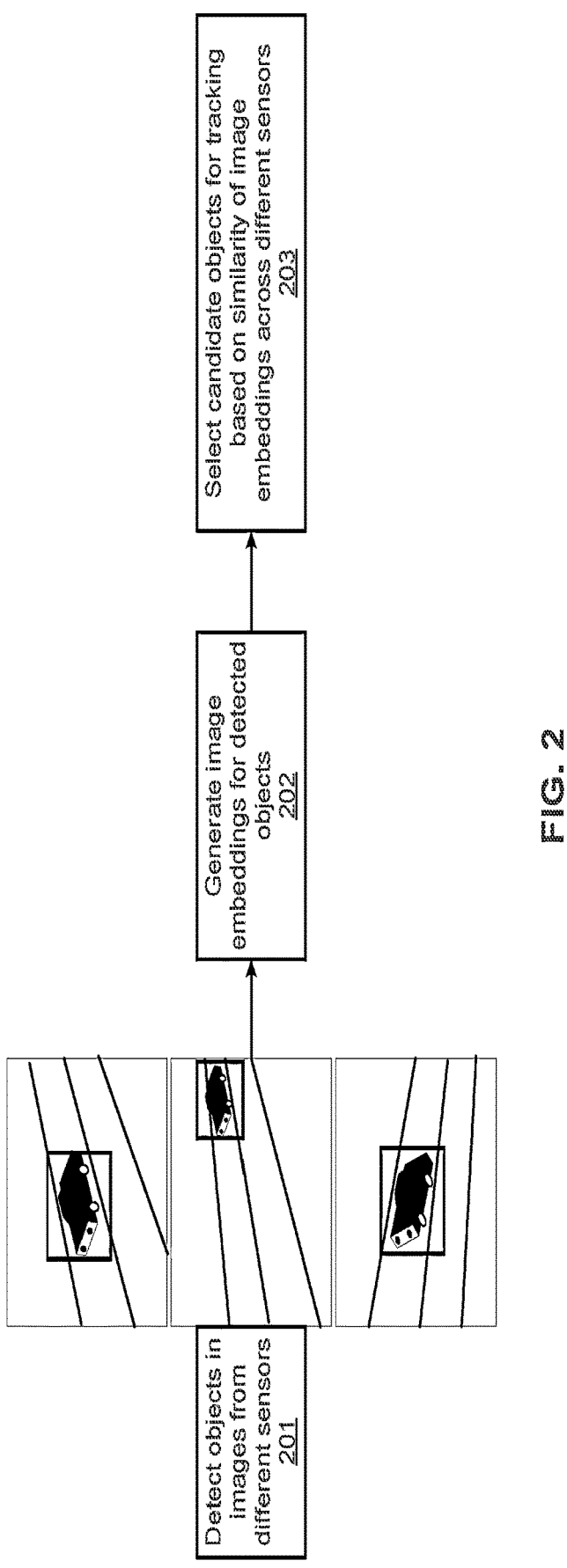
FIG. 2 shows an example process for object detection and association of object detections based on image embeddings, according to various embodiments of the present disclosure.

Referring now to FIG. 2, a method for controlling an autonomous vehicle 100 by associating detections of different sensors is depicted. As shown in FIGS. 1a and 1b, at any given time point (such as Time 0), the autonomous vehicle may receive sensor data including an array of images representative of objects in its field of view (e.g., one image per sensor). The sensors may include image sensors, such as cameras. In some embodiments, cameras may include one or more forward-facing cameras (e.g., a center or near-center mounted camera(s)), such as a wide-view camera, a surround camera, a stereo camera, and/or a long-range or mid-range camera.

The term "camera" refers herein to an image-capturing device that takes images of an environment. For example, the camera may be based on at least one of the following sensors: a CCD sensor, a CMOS sensor, a near infrared (NIR) sensor, an infrared sensor (IR), and a device based on active illumination such as a LiDAR. The term "video" refers to a series of images that may be provided in a fixed rate, variable rates, a fixed resolution, and/or dynamic resolutions. The use of a singular "camera" should be interpreted herein as "one or more cameras". Thus, when embodiments herein are described as including a camera that captures video and/or images of the outside environment in order to generate a representation of the outside environment, the representation may in fact be generated based on images and/or video taken using multiple cameras.

In some embodiments, the method may include preprocessing an image of the subject by the user device or by a camera. The term "image" or "images," as used herein, refers to single or multiple frames of still or animated images, video clips, video streams, etc. Preprocessing may also include cropping, resizing, gradation conversion, median filtering, histogram equalization, or size normalized image processing.

The images may be in any suitable format. Many types of images or formats may be used in the context of the present disclosure, for example, compressed images such as in Joint Photographic Experts Group (JPEG) or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC) or other type of imaging sensor. According to various embodiments of the present disclosure, images may be 8-bit RGB images.

In some embodiments, in addition to image data, sensor data may also include data received from other types of sensors, such as a CCD sensor, a CMOS sensor, a near infrared (NIR) sensor, an infrared sensor (IR), and a device based on active illumination such as a LiDAR.

At 201, the method may include detecting objections in the array of images received from different image sensors. In some embodiments, objects in the images may be detected by an object detector. In some embodiments, the object detector may include a machine-learned detector model. According to various embodiments of the present disclosure, the machine-learn detector model may further include neural networks (e.g., deep neural networks), support vector machines, decision trees, ensemble models, k-nearest neighbors models, Bayesian networks, or other types of models including linear models and/or non-linear models.

In some embodiments, the object detector may be a neural network object detector.

According to various embodiments of the present disclosure, the method may also include prepressing the images based on object detection. In some embodiments, preprocessing may also include cropping, resizing, gradation conversion, median filtering, histogram equalization, or size normalized image processing.

At 202, the method may include generating image embeddings for the objects detected in the images. In some embodiments, the image embeddings may be represented by feature vectors. In some embodiments, the image embedding may include basic properties of the objects, such as position, velocity, object type, and other properties specific to the object type that are informed by the other sensors.

In some embodiments, image embeddings may be generated by an embedding encoder. According to various embodiments of the present disclosure, the embedding encoder may include a neural network that outputs image embeddings that may be used to identify and/or match objects. In accordance with embodiments of the disclosure, the neural network may be trained to learn image embeddings. The image embeddings may be associated with multiple classes of objects. As a non-limiting example, the classes of objects may include vehicles, bicycles, pedestrians, and/or drivable surfaces, etc.

At 203, the method may include identifying the same objects in the images received from different image sensors. According to various embodiments of the present disclosure, the method may include identifying the same objects by pairwise comparison of image embeddings of a first set of objects (or a first object) detected in an image received from one image sensor (e.g., center front camera) and image embeddings of a second set of objects (or a second object) in an image received from another image sensor (e.g., left front camera) and determining a similarity score for the pairwise comparison of image embeddings. In some embodiments, the method may include identifying the objects having a similarity score of image embeddings equal to or greater than a threshold value as the same object, which is also designated as a candidate object for tracking at the next time point.

According to various embodiments of the present disclosure, comparison of image embeddings of objects detected in images received from different image sensors may be performed by clustering, such as k-means clustering, a fuzzy k-means clustering algorithm, a Louvain modularity algorithm, Jarvis-Patrick clustering, or the Density-Based Spatial Clustering of Applications with Noise (DBSCAN) algorithm. k-means clustering is a method of vector quantization, originally from signal processing, that aims to partition n observations into k clusters in which each observation belongs to the cluster with the nearest mean (cluster centers or cluster centroid), serving as a prototype of the cluster. This results in a partitioning of the data space into Voronoi cells. k-means clustering minimizes within-cluster variances (squared Euclidean distances), but not regular Euclidean distances, which would be the more difficult Weber problem: the mean optimizes squared errors, whereas only the geometric median minimizes Euclidean distances. For instance, better Euclidean solutions can be found using k-medians and k-medoids. Fuzzy k-means clustering (also referred to as soft clustering or soft k-means) is a form of clustering in which each data point can belong to more than one cluster. The Louvain method is an algorithm to detect communities in large networks. It maximizes a modularity score for each community, where the modularity quantifies the quality of an assignment of nodes to communities. This means evaluating how much more densely connected the nodes within a community are, compared to how connected they would be in a random network. Jarvis Patrick Clustering Algorithm is a graph-based clustering technique, that replaces the vicinity between two points with the SNN similarity, which is calculated as described in the SNN Algorithm. A threshold is then accustomed to sparsify this matrix of SNN similarities. The DBSCAN algorithm is a base algorithm for density-based clustering. It can discover clusters of different shapes and sizes from a large amount of data, which is containing noise and outliers.

According to various embodiments of the present disclosure, the method may include using the DBSCAN algorithm to compute the clusters.

In some embodiments, similarity scores may be represented by Euclidean distance. In some embodiments, a Euclidean distance threshold value for the similarity score may be set depending on a desired precision and/or recall value. According to various embodiments of the present disclosure, the threshold value may be 0.2, 0.3, 0.4, 0.5, 0.6, 0.7, 0.8, 0.9, and 0.95. In some embodiments, the threshold value may be 0.5, 0.6, or 0.7.

According to various embodiments of the present disclosure, after a track for a candidate object has been initialized, the method may include acquiring additional images at next time points from different image sensors and repeating steps 201, 202, and 203. In some embodiments, image embeddings of newly detected objects in the additional images will be compared (or clustered) with the image embeddings of existing candidate objects. If similarity scores of such comparison (or clustering) are equal to or greater than a threshold value, the image embeddings of the newly detected objects will be used to update the image embeddings of the existing candidate objects, such that the properties of the candidate objects can be dynamically and continuously updated and tracked.

In some embodiments, if a similarity score of the image embeddings of the newly detected objects and the image embeddings of the existing candidate objects does not meet the threshold value, a new track may be initialized to track these newly detected objects.

Figure 3:
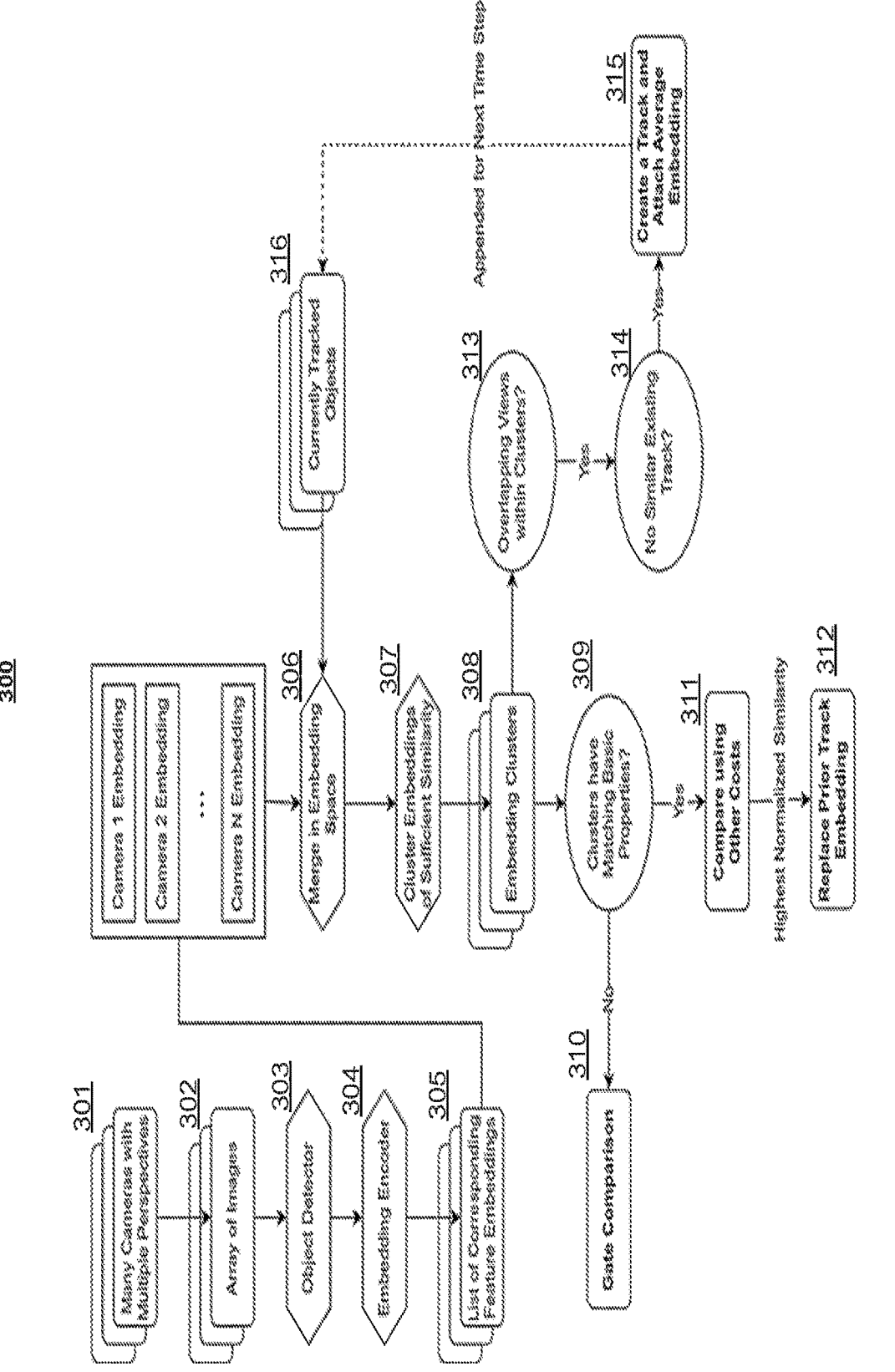
FIG. 3 shows an example process for dynamically detecting and tracking objects through associated detections, according to various embodiments of the present disclosure.

Referring now to FIG. 3, an example method 300 may be implemented to control the autonomous vehicle navigating a vehicle by detecting and tracking objects through associated detections, in accordance with various embodiments of the present disclosure. In some embodiments, steps described herein may be iteratively performed to achieve desired precision and/or accuracy.

At 301, the method may include acquiring image data containing images from two or more image sensors (e.g., cameras) representative of multiple perspectives of objects in a field of view of the autonomous vehicle. For example, image data may be acquired from the three frontal cameras (e.g., left front camera, center front camera, right front camera). However, it would be understood by a person skilled in the art that the image data may be acquired from a larger array of cameras around the autonomous vehicle mounted in any position. According to various embodiments of the present disclosure, the cameras each may provide an image, and different cameras may have different fields of view. For example, the center camera may have a wider field of view and hence a shorter range than a side camera.

At 302, an array of images received from different image sensors may be used as inputs for object detection. According to various embodiments of the present disclosure, the image sensors may include without limitation a camera based on at least one of the following sensors: a CCD sensor, a CMOS sensor, a near infrared (NIR) sensor, an infrared sensor (IR), and a device based on active illumination such as a LiDAR.

Many types of images or formats may be used as inputs, for example, compressed images such as in Joint Photographic Experts Group (JPEG) or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC) or other type of imaging sensor. If needed, different formats and/or resolutions may be used in training a machine learning model, e.g., for detecting objects in the field of view of the autonomous vehicle. According to various embodiments of the present disclosure, images may be 8-bit RGB images. In addition, the array of images may be formed from the most recent images captured by image sensors for each cycle of detection. In some embodiments, the array of images used as inputs for object detection may include one image from each image sensor per cycle. Thus, the number of images in the array of images is equal to the number of image sensors.

At 303, the method may include detecting objects in the image data received from different image sensors. According to various embodiments of the present disclosure, the object detector may be a neural network object detector.

At 304, the method may include generating image embeddings for objects detected in each image. According to various embodiments of the present disclosure, image embeddings may be generated by an embedding encoder. In some embodiments, the encoder may be trained using the Supervised Contrastive Learning Loss on a dataset of approximately ~100,000 crops. The loss may be selected with the intention to separate dissimilar objects as far apart as possible in a learned embedding space by pulling identical objects together and pushing dissimilar objects further apart with hard negative mining.

The trained model can then be validated and tested on a dataset of approximately ~20,000 crops each. In some embodiments, the embedding output size may be 32 to minimize the computational and memory load that each detection and tracked object needs to carry, as well as minimize the time and computing required to compare detections with other detections or tracks. For example, the model may have an average precision of 0.92, F1-score, precision, and recall of 0.85 at the dot product threshold of 2.34, and a JS divergence of 0.57 between positive and negative pair examples.

In some embodiments, the model may have a backbone of RegNetY with a single linear layer projection head. RegNetY is a convolutional network design space with simple, regular models with parameters: depth $dd$, initial width $w\_0>0w\_0>0$, and slope $w\_a>0w\_a>0$, and generates a different block width $u\_ju\_j$ for each block $j<dj<d$. The model may be trained on a batch size of 256 to maximize negative sample mining, validated on a batch size of 32, and tested on a batch size of 16. Additionally, the model may be trained over 10 epochs at a learning rate of 3.3e-5 down to a minimum learning rate of 3.3e-7 with the cosine annealing scheduler. In some embodiments, the optimizer may have a weight decay rate of 1e-6, and the contrastive loss may have a temperature of 0.07.

At 305, the method may include generating from the above embedding stage a list of corresponding feature embeddings of the detected objects in the environment of the autonomous vehicle. For example, a list of corresponding feature embeddings of the detected objects may be generated by the embedding encoder. Feature embeddings may be provided as feature vectors. In some embodiments, feature embeddings may be provided as a 32-dimensional feature vector for each corresponding detection.

At 306, the method may include merging current track embeddings with new detection embeddings in the embedding space. Merging the current track embeddings with detection embeddings into the same learned space may enable clustering to include both when formulating pairwise comparisons. This step, for example, concatenates existing track embeddings into the newly generated set of detections embedding.

At 307, the method may also include clustering embeddings of sufficient similarity. The clustering step is a pre-processing step that will allow pairwise connections to be very quickly drawn within independent clusters. This can be done incrementally to improve computational efficiency. According to various embodiments of the present disclosure, the method may include using the DBSCAN algorithm to compute the clusters. For example, clustering may use a maximum distance (eps) of 0.99 and a minimum of 2 samples out of a test set of ~13,000 embeddings, which can result in an excellent adjusted mutual information score (AMI) (e.g., 0.793) with an average cluster size of 15.24 for 842 clusters. Optimal parameters will change for different models.

At 308, the method may include assigning each cluster of embeddings a label that contains a cluster ID from DBSCAN, which allows sorting and finding all embeddings within the same cluster.

At 309, the method may include clustering embeddings based on basic properties. In some embodiments, basic properties include if they are the same object type, exist in overlapping camera views based on their 3D position, and pass the minimum threshold to be considered a true positive pairing from dot product similarity, for example. In some embodiments, the dot product similarity may be set to have a high recall (e.g., 0.9 to 0.99) to include nearly all true positives. It is understood by a person skilled in the art that the threshold can be set and varied based on onboard performance.

At 310, the method may include conducting gate comparison. For example, if the embedding similarity score is below the minimum threshold, pairwise comparisons may be gated to avoid any future computation that would have otherwise occurred, saving significant computation overall for pairwise associations. This is a unique application of embeddings to track association that can be added on top of existing tracking pipelines through learned visual features.

At 311, the method may include determining embedding similarity between the pair by taking into account other costs, such as a normalized cost of the embedding similarity between the pair. It also may include a fusion of other measured information from other detectors, such as bearing, range, position, size, shape, and variance of measurements.

At 312, the method may include replacing prior track embedding. In particular, for each cycle, the method may include comparing image embeddings of new detections with image embedding of an existing track, and replacing the image embeddings of the existing track with the image embeddings of a new detection that has the highest similarity score. This is to ensure the tracked object embedding does not become outdated over time, so that the object could be tracked over a long duration. This happens when the association is deemed valid from the previous step.

At 313, the method may include overlapping views within embedding clusters. As described at 308 for embedding clusters, the pairwise comparison only occurs if the object can be seen from the two different corresponding cameras. For example, the front camera may not provide a detection that is associated with the detection from the back camera, but a common detection with the front left camera is much more plausible. Similarly, overlapping views within embedding clusters may take place when detections are likely to be associated.

At 314, the method may include initializing new tracks if no similar embedding of new detections is similar to a current track. For example, if there is no current track that exists in the cluster, assuming all previous conditions are satisfied, then a track can be initiated if there are three or more detections of the same object clustered together by the embedding or two common detections over two time steps. Otherwise, the detections belong to the track and will continue the track rather than initiate a new one.

At 315, the method may include creating a track and attaching average embedding. For example, once there are a set of common detections that are not similar to any existing object tracks, a track may be created and the mean (average) embedding is attached to the track along with the other measurements, such as position, velocity, object type, and other properties specific to the object type that are informed by the other sensors.

At 316, the method may include updating existing tracks for currently tracking objects through one or more iterations. For example, newly initialized tracks from the previous cycle (0.1 s in duration for each perception cycle) may correspond to a set of currently tracked objects within the scene include. These tracked objects may then be fed into the pipeline repeatedly in each cycle to continue persisting with associated detections or disappear through a number of no associated detections.

Referring now to FIG. 4, an example method 400 for controlling the autonomous vehicle by dynamically detecting and tracking objects through associating detections of different image sensors is depicted, in accordance with various embodiments of the present disclosure.

At 401, the method 400 may include receiving sensor data including image data from sensors of the autonomous vehicle. In some embodiments, the image data may include a plurality of images representative of objects in a field of view of the autonomous vehicle.

In some embodiments, the sensor data may include the sensor data generated by one or more forward-facing cameras (e.g., a center or near-center mounted camera(s)), such as a wide-view camera, a surround camera, a stereo camera, and/or a long-range or mid-range camera. This sensor data may be useful for computer vision and/or perception when navigating, e.g., within a lane, through a lane change, through a turn, through an intersection, etc., because a forward-facing camera may include a field of view (e.g., the field of view of the forward-facing stereo camera and/or the wide-view camera) that includes both a current lane of travel of the autonomous vehicle, adjacent lane(s) of travel of the autonomous vehicle, and/or boundaries of the driving surface.

In some embodiments, more than one camera or other sensor (e.g., LIDAR sensor, RADAR sensor, etc.) may be used to incorporate multiple fields of view (e.g., the fields of view of the long-range cameras, the forward-facing stereo camera, and/or the forward facing wide-view camera). In some embodiments, real-time visual sensor data (e.g., data representative of images and/or videos, LIDAR data, RADAR data, etc.) may be received from sensors (e.g., one or more cameras, one or more LIDAR sensors, one or more RADAR sensors, etc.) located on an autonomous vehicle. In some embodiments, sensor data may include image data representing an image(s), image data representing a video (e.g., snapshots of video), and/or sensor data representing fields of view of sensors (e.g., LIDAR sensor, RADAR sensor, etc.).

In some embodiments, the sensors may include two or more cameras, e.g., one or more forward-facing cameras (e.g., a center or near-center mounted camera(s)), such as a wide-view camera, a surround camera, a stereo camera, and/or a long-range or mid-range camera.

In some embodiments, the system may resize the photo or the videos according to a threshold value (e.g., maximum size in kilobytes, megabytes or gigabytes, maximum or minimum resolution in dots per inch (DPI) or pixels per inch (PPI)). In some embodiments, the system may resize the photo or the videos based on the transmission rate of the network and the links.

In some embodiments, the method may include cropping and/or resizing the images prior to detecting the objects.

At 402, the method may include detecting the objects in the plurality of images through an object detector. In some embodiments, object detection may be implemented with one or more ranging systems as part of a sensor system, such as, for example, a Light Detection and Ranging (LIDAR) system and/or a Radio Detection and Ranging (RADAR) system. The one or more ranging systems can capture a variety of ranging data and provide it to a vehicle computing system, for example, for the detection, classification, and tracking of objects of interest during the operation of the autonomous vehicle. Additionally, in some embodiments, the object detection system can implement LIDAR-based object detection. In some embodiments, LIDAR-based object detection can include generating a multi-channel data matrix from the LIDAR data and possibly map data for the surrounding environment (or receiving such a multi-channel data matrix from other autonomous vehicle applications)

and inputting the multi-channel data matrix into a machine-learned detector model (e.g., a convolutional neural network). The machine-learned detector model outputs can include one or more object instances including one or more property estimations characterizing the object instances, which can be used in a vehicle computing system of an autonomous vehicle, such as in perception, prediction, motion planning, and vehicle control.

In some embodiments, the machine-learned detector model can include various models, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, convolutional neural networks, recurrent neural networks (e.g., long short-term memory recurrent neural networks), or other forms of neural networks.

In some embodiments, the object detector comprises a neural network object detector.

At 403, the method may include generating image embeddings for the objects detected in the plurality of images.

In some embodiments, the image embeddings may be represented by feature vectors. In some embodiments, the step of generating the image embeddings comprises generating the image embeddings by an embedding encoder. According to various embodiments of the present disclosure, the embedding encoder may include a neural network that outputs image embeddings that may be used to identify and/or match objects. In accordance with embodiments of the disclosure, the neural network may be trained to learn image embeddings. The image embeddings may be associated with multiple classes of objects. As a non-limiting example, the classes of objects may include vehicles, bicycles, pedestrians, and/or drivable surfaces, etc.

The machine-learned image embedding model can be previously trained via one or more machine learning techniques using one or more images as constraints. For example, in some implementations, the machine-learned image embedding model can be previously trained by minimizing a loss over a triplet training scheme via backpropagation. For example, the triplet training scheme can utilize a plurality of image triplets. For example, the plurality of image triplets can be collected from a global image database including a plurality of images.

In some embodiments, the embedding encoder may be trained using contrastive representation learning. Contrastive representation learning is a machine learning technique used to learn the general features of a dataset without labels by teaching the model which data points are similar or different. Contrastive representation learning is to learn representations by maximizing the consistency between different augmented semantics of the same data sample through a contrastive loss in the latent space. Contrastive self-supervised learning can construct representations by learning coding, which makes two things similar or different, so that the relationship extraction model continuously learns similar entity relationships during the training process to improve the prediction accuracy of semantic relationships, which can effectively improve the relation extraction accuracy of relation extraction models.

At 404, the method may include determining similarity scores of the image embeddings of the objects that are detected in images received from two or more different sensors, such as image sensors (e.g., cameras).

At 405, the method may include identifying the objects that are detected in the images received from the two or more different sensors as a candidate object for tracking, if the objects have a similarity score of the image embeddings equal to or greater than a threshold value.

In some embodiments, the method may further include: generating additional image embeddings for objects detected in a second set of images received at a different time; and determining similarity scores between the image embeddings and the additional image embeddings.

In some embodiments, the method comprises: determining a second similarity score between an image embedding of the candidate object and the additional image embeddings; and updating the image embedding of the candidate object if the second similarity score is equal to or greater than the threshold value. For example, if comparing a detection and a track, the track will replace the current track embedding with a new one. The current track embedding may be replaced by the detection feature embedding with the highest similarity in the current cycle. This is to ensure the tracked object embedding does not become outdated over time, so that the object could be tracked over a long duration.

In some embodiments, the method comprises performing incremental clustering to determine the similarity scores between existing image embeddings and new embeddings. Clustering is an example of unsupervised learning. Cluster analysis, or clustering, is the task of grouping a set of objects in such a way that objects in the same group, called a cluster, are more similar in some sense to each other than to those in other groups. Clustering is a common technique in statistical data analysis, and is used in fields such as machine learning, pattern recognition, image analysis, and information retrieval. Methods for clustering vary according to the data being analyzed. A method that is popular in data mining is k-means clustering, in which a dataset is partitioned into a predetermined number, k, of clusters.

Incremental clustering, variously known as online, data stream, or dynamic clustering, refers to methods of clustering data that arrives continuously. Incremental clustering methods update existing clusters as new data arrives. This may include assigning objects for clustering to existing clusters, creating new clusters, and merging or deleting existing clusters. Various methods of incremental clustering, for example, based on k-means, exist.

At 406, the method may include initializing a track for the candidate object. After initializing a track for the candidate object, steps 401-405 may be repeated to continuously update image embeddings and tracked objects.

Figure 5:
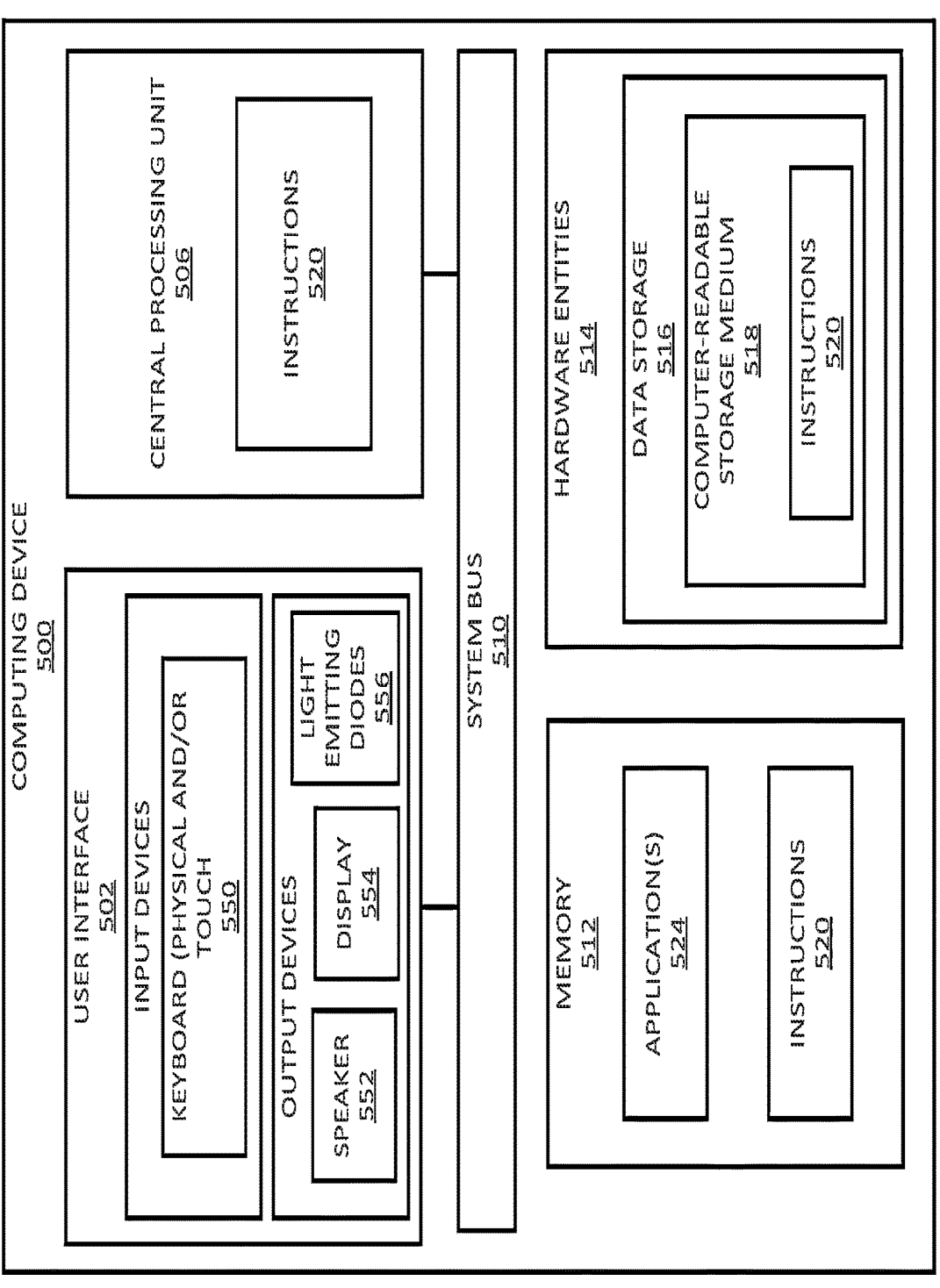
FIG. 5 shows example elements of a computing device, according to various embodiments of the present disclosure.

Referring now to FIG. 5, an illustration of an example architecture for a computing device 500 is provided. Computing device 500 may include more or fewer components than those. The hardware architecture of FIG. 5 represents one example implementation of a representative computing device configured to one or more methods and means for controlling the autonomous vehicle 100 in response to an abnormal condition of the autonomous vehicle 100, as described herein. As such, the computing device 500 of FIG. 5 implements at least a portion of the method(s) described herein (for example, method 300 of FIG. 3 and/or method 400 of FIG. 4).

Some or all components of the computing device 500 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 5, the computing device 500 comprises a user interface 502, a Central Processing Unit ("CPU") 506, a system bus 510, a memory 512 connected to and accessible by other portions of computing device 500 through system bus 510, and hardware entities 514 connected to system bus 510. The user interface can include input devices and output devices, which facilitate user-software interactions for controlling operations of the computing device 500. The input devices may include, but are not limited to, a physical and/or touch keyboard 550. The input devices can be connected to the computing device 500 via a wired or wireless connection (e.g., a Bluetooth® connection). The output devices may include, but are not limited to, a speaker 552, a display 554, and/or light emitting diodes 556.

At least some of the hardware entities 514 perform actions involving access to and use of memory 512, which can be a Random Access Memory (RAM), a disk driver and/or a Compact Disc Read Only Memory (CD-ROM), among other suitable memory types. Hardware entities 514 can include a data storage 516 comprising a computer-readable storage medium 518 on which is stored one or more sets of instructions 520 (e.g., programming instructions, such as, but not limited to, software code) configured to implement one or more of the methodologies, procedures, or functions described herein. The instructions 520 can also reside, completely or at least partially, within the memory 512 and/or within the CPU 506 during execution thereof by the computing device 500. The memory 512 and the CPU 506 also can constitute machine-readable media. The term "machine-readable media," as used here, refers to a single medium or multiple media (e.g., a centralized or distributed database, and/or associated caches and servers) that store the one or more sets of instructions 520. The term "machine-readable media," as used here, also refers to any medium that is capable of storing, encoding or carrying a set of instructions 520 for execution by the computing device 500 and that cause the computing device 500 to perform any one or more of the methodologies of the present disclosure.

Figure 6:
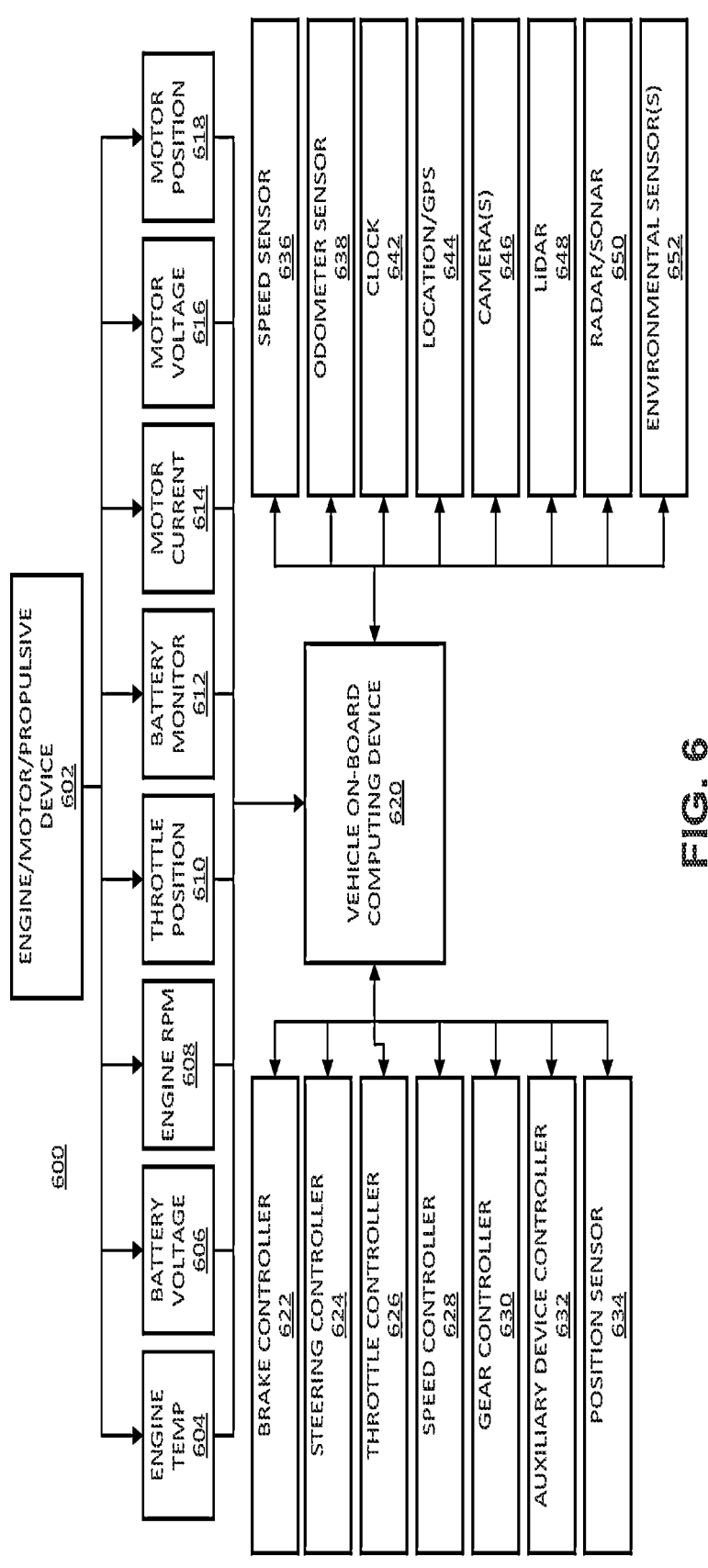
FIG. 6 shows an example architecture of a vehicle, according to various embodiments of the present disclosure.

Referring now to FIG. 6, an example vehicle system architecture 600 for a vehicle is provided, in accordance with various embodiments of the present disclosure.

The autonomous vehicle 100 can have the same or similar system architecture as shown in FIG. 6. Thus, the following discussion of vehicle system architecture 600 is sufficient for understanding the autonomous vehicle 100.

As shown in FIG. 6, the vehicle system architecture 600 includes an engine, motor or propulsive device (e.g., a thruster) 602 and various sensors 604-618 for measuring various parameters of the vehicle system architecture 600. In gas-powered or hybrid vehicles having a fuel-powered engine, the sensors 604-618 may include, for example, an engine temperature sensor 604, a battery voltage sensor 606, an engine Rotations Per Minute (RPM) sensor 608, and/or a throttle position sensor 610. If the vehicle is an electric or hybrid vehicle, then the vehicle may have an electric motor, and accordingly will have sensors such as a battery monitoring system 612 (to measure current, voltage and/or temperature of the battery), motor current 614 and voltage 616 sensors, and motor position sensors such as resolvers and encoders 618.

Operational parameter sensors that are common to both types of vehicles include, for example, a position sensor 634, such as an accelerometer, gyroscope and/or inertial measurement unit; a speed sensor 636; and/or an odometer sensor 638. The vehicle system architecture 600 also may have a clock 642 that the system uses to determine vehicle time during operation. The clock 642 may be encoded into the vehicle onboard computing device 620. It may be a separate device, or multiple clocks may be available.

The vehicle system architecture 600 also may include various sensors that operate to gather information about the environment in which the vehicle is traveling. These sensors may include, for example, a location sensor 644 (for example, a Global Positioning System (GPS) device); object detection sensors such as one or more cameras 646; a LiDAR sensor system 648; and/or a radar and/or a sonar system 650. The sensors also may include environmental sensors 652, such as a precipitation sensor and/or ambient temperature sensor. The object detection sensors may enable the vehicle system architecture 600 to detect objects that are within a given distance range of the vehicle 600 in any direction, while the environmental sensors 652 collect data about environmental conditions within the vehicle's area of travel.

During operations, information is communicated from the sensors to an onboard computing device 620. The onboard computing device 620 may be configured to analyze the data captured by the sensors and/or data received from data providers, and may be configured to optionally control operations of the vehicle system architecture 600 based on the results of the analysis. For example, the onboard computing device 620 may be configured to control: braking via a brake controller 622; direction via a steering controller 624; speed and acceleration via a throttle controller 626 (in a gas-powered vehicle) or a motor speed controller 628 (such as a current level controller in an electric vehicle); a differential gear controller 630 (in vehicles with transmissions); and/or other controllers.

Geographic location information may be communicated from the location sensor 644 to the onboard computing device 620, which may then access a map of the environment that corresponds to the location information to determine known fixed features of the environment such as streets, buildings, stop signs and/or stop/go signals. Captured images from the cameras 646 and/or object detection information captured from sensors such as LiDAR 648 are communicated from those sensors to the onboard computing device 620. The object detection information and/or captured images are processed by the onboard computing device 620 to detect objects in proximity to the vehicle. Any known or to be known technique for making an object detection based on sensor data and/or captured images may be used in the embodiments disclosed in this document.

The present disclosure is not to be limited in scope by the specific embodiments described herein. Indeed, various modifications of the invention in addition to those described herein will become apparent to those skilled in the art from the foregoing description and the accompanying figures. Such modifications are intended to fall within the scope of the appended claims.

What is claimed is:

1. A method of dynamically detecting and tracking objects in an environment of an autonomous vehicle, comprising:
  receiving image data from sensors of the autonomous vehicle, the image data comprising a plurality of images representative of objects in a field of view of the autonomous vehicle; and
  using a processor:
    detecting the objects in the plurality of images through an object detector;
    generating image embeddings for the objects detected in the plurality of images;

determining similarity scores of the image embeddings of the objects that are detected in images received from two or more different sensors;

identifying the objects that are detected in the images received from the two or more different sensors as a candidate object for tracking, if the objects have a similarity score of the image embeddings equal to or greater than a threshold value; and initializing a track for the candidate object.

2. The method of claim 1, wherein the step of generating the image embeddings comprises generating the image embeddings by an embedding encoder trained using contrastive representation learning.

3. The method of claim 1, further comprising: generating additional image embeddings for objects detected in a second set of images received at a different time; and determining similarity scores between the image embeddings and the additional image embeddings.

4. The method of claim 3, comprising performing incremental clustering to determine the similarity scores between existing image embeddings and new embeddings.

5. The method of claim 3, comprising: determining a second similarity score between an image embedding of the candidate object and the additional image embeddings; and updating the image embedding of the candidate object if the second similarity score is equal to or greater than the threshold value.

6. The method of claim 1, wherein the sensors comprise two or more cameras.

7. The method of claim 1, comprising preprocessing the images prior to detecting the objects.

8. The method of claim 1, wherein the image embeddings are represented by feature vectors.

9. The method of claim 1, wherein the object detector comprises a neural network object detector.

10. The method of claim 1, wherein the step of determining the similarity scores of image the embeddings of the objects comprising determining the similarity scores of image the embeddings of the objects by clustering using the DBSCAN algorithm.

11. A system for dynamically detecting and tracking objects in an environment of an autonomous vehicle, comprising:

a plurality of sensors, configured to receive image data comprising a plurality of images representative of objects in a field of view of the autonomous vehicle; and a processor, configured to:

detect the objects in the plurality of images through an object detector;

generate image embeddings for the objects detected in the plurality of images;

determine similarity scores of the image embeddings of the objects that are detected in images received from two or more different sensors;

identify the objects that are detected in the images received from the two or more different sensors as a candidate object for tracking, if the objects have a similarity score of the image embeddings equal to or greater than a threshold value; and initialize a track for the candidate object.

12. The system of claim 11, wherein the processor is configured to generate the image embeddings by an embedding encoder trained using contrastive representation learning.

13. The system of claim 11, wherein the processor is further configured to generate additional image embeddings for objects detected in a second set of images received at a different time, and determine similarity scores between the image embeddings and the additional image embeddings.

14. The system of claim 13, wherein the processor is configured to perform incremental clustering to determine the similarity scores between existing image embeddings and new embeddings.

15. The system of claim 13, wherein the processor is configured to determine a second similarity score between an image embedding of the candidate object and the additional image embeddings, and update the image embedding of the candidate object if the second similarity score is equal to or greater than the threshold value.

16. The system of claim 11, wherein the sensors comprise two or more cameras.

17. The system of claim 11, wherein the processor is configured to preprocess the images prior to detecting the objects.

18. The system of claim 11, wherein the image embeddings are represented by feature vectors.

19. The system of claim 11, wherein the object detector comprises a neural network object detector.

20. The system of claim 11, wherein the processor is configured to determine the similarity scores of image the embeddings of the objects by clustering using the DBSCAN algorithm.

* * * * *